(12) United States Patent
Matsuda

(10) Patent No.: US 6,795,906 B2
(45) Date of Patent: Sep. 21, 2004

(54) MEMORY CONTROLLER, INTERFACE DEVICE AND METHOD USING A MODE SELECTION SIGNAL TO SUPPORT DIFFERENT TYPES OF MEMORIES

(75) Inventor: Yoichi Matsuda, Tokyo (JP)

(73) Assignee: NEC Corporation, Tokyo (JP)

( * ) Notice: Subject to any disclaimer, the term of this patent is extended or adjusted under 35 U.S.C. 154(b) by 38 days.

(21) Appl. No.: 09/880,938

(22) Filed: Jun. 15, 2001

(65) Prior Publication Data

US 2001/0054135 A1 Dec. 20, 2001

(30) Foreign Application Priority Data

Jun. 16, 2000 (JP) ......................................... 2000-181932

(51) Int. Cl.[7] ..................... G06F 13/00; G11C 11/4093; G11C 11/4076
(52) U.S. Cl. ........................ 711/167; 711/105; 365/233
(58) Field of Search ........................... 711/167, 5, 105; 710/14; 365/233

(56) References Cited

U.S. PATENT DOCUMENTS

| | | | | |
|---|---|---|---|---|
| 6,023,175 A | * | 2/2000 | Nunomiya et al. | 326/68 |
| 6,060,916 A | * | 5/2000 | Park | 327/99 |
| 6,094,375 A | * | 7/2000 | Lee | 365/189.04 |
| 6,151,271 A | * | 11/2000 | Lee | 365/233 |
| 6,279,073 B1 | * | 8/2001 | McCracken et al. | 711/105 |
| 6,335,901 B1 | * | 1/2002 | Morita et al. | 365/233 |
| 6,337,832 B1 | * | 1/2002 | Ooishi et al. | 365/233 |

FOREIGN PATENT DOCUMENTS

| | | |
|---|---|---|
| JP | 4-326140 | 11/1992 |
| JP | 10-302465 | 11/1998 |
| JP | 11-68879 | 3/1999 |
| JP | 11-88146 | 3/1999 |
| JP | 2000-231534 | 8/2000 |
| KR | 1998-077763 | 11/1998 |
| KR | 1999-0057677 | 7/1999 |
| WO | 99/52213 | 10/1999 |
| WO | 99/67789 | 12/1999 |

OTHER PUBLICATIONS

Ikurou Watanabe, "AT Converter Chipset," Japan, AI Publishing Corp., 1999, pp. 322–326 and 468–470.
Osamu Hirabayashi et al., DDR Specification High–Speed SRAM Data Bus Architecture, Electronic Information and Telecommunication Association Technical Research Report, Japan, Electronic Infomration and Telecommunication Association, V. 98, 1998, pp. 1–6.

* cited by examiner

Primary Examiner—Glenn Gossage
(74) Attorney, Agent, or Firm—Young & Thompson (57) ABSTRACT

A memory controller, interface (I/F) device and method for controlling data communication with a memory device are disclosed. The memory controller allows different types of memory devices to be supported. The memory controller has a first buffer for capturing data at a rising edge of a timing control signal and a second buffer for capturing data at a falling edge of the timing control signal. A mode controller controls or adjusts the timing control signal depending on which one of single data rate (SDR) synchronous dynamic random access memory (SDRAM) mode and double date rate (DDR) mode is selected in response to a mode selection or switch signal. In SDR SDRAM mode, a clock signal is supplied to only the first buffer. In DDR mode, a data strobe signal is supplied to both the first and second buffers. The memory controller may also include a level adjuster for adjusting voltage levels of signals transferred between the memory device and buffers.

16 Claims, 8 Drawing Sheets

MEMORY CONTROLLER, INTERFACE DEVICE AND METHOD USING A MODE SELECTION SIGNAL TO SUPPORT DIFFERENT TYPES OF MEMORIES

BACKGROUND OF THE INVENTION

1. Field of the Invention

The present invention relates to a memory controller, and in particular to a memory control technique supporting a plurality of different specifications of random access memory (RAM).

2. Description of the Related Art

With the increasing speed of central processing units (CPUs), the demand for high-speed dynamic RAM (DRAM) is growing and thereby various types of DRAM have been developed and put in use. A well-known type of DRAM is a synchronous DRAM (SDRAM), which transfers data synchronously with an external clock signal. In SDRAM, the data transfer timing for read and write operations is synchronized with the rising edge of the external clock signal. Current information processing systems such as personal computer (PC) systems are typically designed to use SDRAM.

As next generation DRAM, there are considered a RAM-BUS® DRAM for personal computers and a double data rate (DDR) SDRAM for servers. In DDR SDRAM, the data transfer timing for read and write operations is synchronized with the rising and falling edges of the clock signal or data strobe signal. Since SDRAM employs a rising edge of the clock signal, a memory controller designed for SDRAM is not applied to DDR SDRAM. Accordingly, it is desirable to provide compatibility for both SDRAM and DDR SDRAM within the same system.

To provide such compatibility, a semiconductor memory device selectively operating in a single data rate (SDR) mode and a DDR mode has been disclosed in Japanese Patent Application Unexamined Publication Kokai No. 10-302465. More specifically, the semiconductor memory device is provided with an operation controller which selects one of the SDR mode and the DDR mode depending on an external adjustment signal. When the SDR mode is selected, pulses are generated at timing corresponding to one edge of a system clock signal. In the case of the DDR mode selected, pulses are generated at timing corresponding to both edges of the system clock signal.

However, the conventional mode selection mechanism is incorporated within the semiconductor memory device. Accordingly, memory manufacturing steps become complicated, resulting in increased cost of manufacturing. Taking into consideration progression of technical innovation in the field of memory, it is necessary to enhance general versatility and extensibility in a memory controller to handle different types of memory which may be developed in the future.

SUMMARY OF THE INVENTION

An object of the present invention is to provide a memory controller and control method having general versatility and enhanced extensibility, allowing different types of memory devices to be supported.

According to the present invention, a memory controller separate from a memory device to be controlled is provided with a function of supporting different types of memory devices.

According to an aspect of the present invention, a memory controller for controlling data communication with a memory device, includes: a timing adjuster for adjusting timing of data transfer between the memory device and a data bus depending on a timing control signal; and a mode controller for controlling the timing control signal to meet timing requirements of the memory device depending on a mode selection signal inputted from outside.

The memory controller may further include a level adjuster for adjusting a voltage level of data to be transferred between the memory device and the data bus depending on a type of the memory device.

According to another aspect of the present invention, a memory controller includes: a first buffer for capturing data at a rising edge of a timing control signal; a second buffer for capturing data at a falling edge of the timing control signal; and a mode controller for controlling the timing control signal to meet timing requirements of the memory device depending on a mode selection signal inputted from outside.

The mode controller may select one of a clock signal and a data strobe signal as the timing control signal depending on the mode selection signal. In the case where the memory device is a synchronous RAM (random access memory), the mode controller selects the clock signal to supply it as the timing control signal to the first buffer. In the case where the memory device is a double data rate (DDR) synchronous RAM, the mode controller selects the data strobe signal to supply it as the timing control signal to the first and second buffers.

The memory controller may further include a level adjuster for adjusting a voltage level of data to be transferred between the memory device and the data bus depending on a type of the memory device.

According to still another aspect of the present invention, an interface device connecting a processor and a memory device through a bus, includes: a memory controller for controlling data communication with the memory device, wherein the memory controller comprises: a timing adjuster for adjusting timing of data transfer between the memory device and a data bus depending on a timing control signal; and a mode controller for controlling the timing control signal to meet timing requirements of the memory device depending on a mode selection signal inputted from outside.

According to another aspect of the present invention, a control method for controlling data communication with a memory device, includes the steps of: a) capturing data in a first buffer at a rising edge of a timing control signal; b) capturing the data in a second buffer at a falling edge of the timing control signal; and c) controlling the timing control signal to meet timing requirements of the memory device depending on a mode selection signal inputted from outside.

DESCRIPTION OF THE PREFERRED EMBODIMENTS

Figure 1:
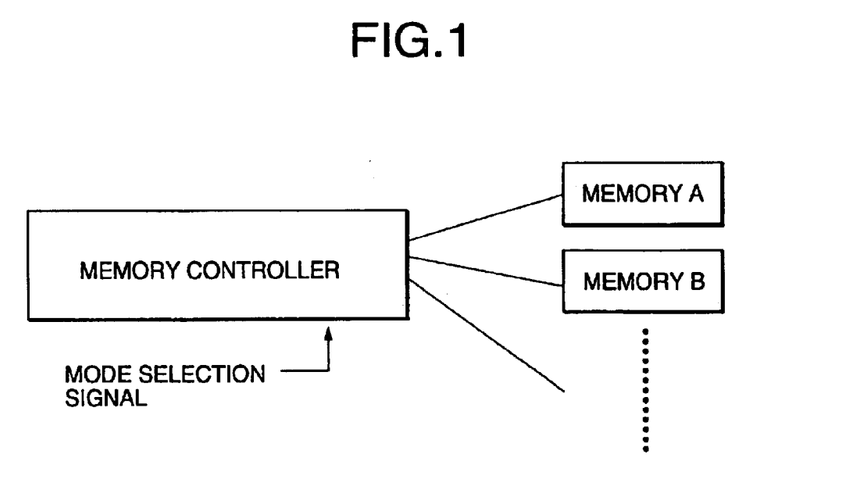
FIG. 1 is a schematic diagram showing a mode selection operation according to the present invention.

Referring to FIG. 1, a memory controller according to the present invention is designed to support a plurality of memories A, B, which have different specifications, for example, single data rate (SDR) synchronous RAM such as SDR SDRAM, double data rate RAM such as DDR SDRAM, static RAM (SRAM), DDR SRAM, and so on. The memory controller can be set to a selected one of a plurality of internal states each corresponding to the different-type memories depending on a mode selection signal received from outside. The details of the memory controller will be described hereafter, taking as an example the case where both SDR SDRAM and DDR SDRAM are supported.

System Configuration

Figure 2:
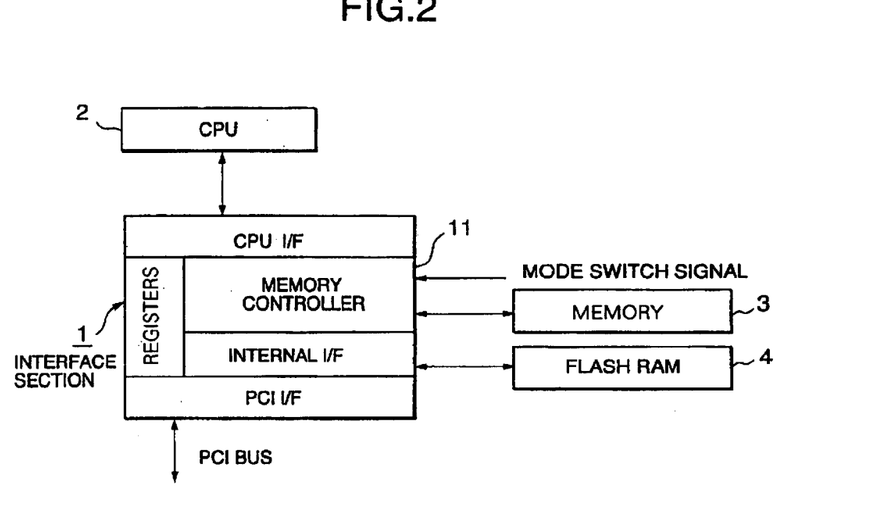
FIG. 2 is a block diagram showing an example of an information processing system employing a memory controller according to an embodiment of the present invention.

Referring to FIG. 2, an information processing system includes an interface section 1, a CPU 2, a memory 3, and a flash memory 4. The interface section 1 is composed of a memory controller 11 according to the present invention, device interfaces (I/F) to the CPU 2, the flash RAM 4, and PCI bus, and registers for function setting, memory form factor indication and the like. The CPU 2 performs data read and write of the memory 3 and flash RAM 4 through the interface section 1. In this example, the memory 3 is one of SDR SDRAM and DDR SDRAM, which may be used as a work memory in the system. The flash RAM 4 may previously store necessary data such as programs and various control data.

The interface section 1 and the CPU 2 may be formed as an integrated circuit on a single semiconductor substrate. The interface section 1 and the CPU 2 may be formed individually as an integrated circuit. As described before, the memory controller 11 is supplied with the mode selection signal. For example, when the mode selection signal is high, the internal state of the memory controller 11 is changed to SDR SDRAM mode and, when low, it is changed to DDR mode.

Accordingly, even if the memory 3 is changed from SDR SDRAM to DDR SDRAM, the memory controller 11 allows data communication with the memory 3 without changing specifications of the CPU and DDR SDRAM.

Memory Controller

Figure 3:
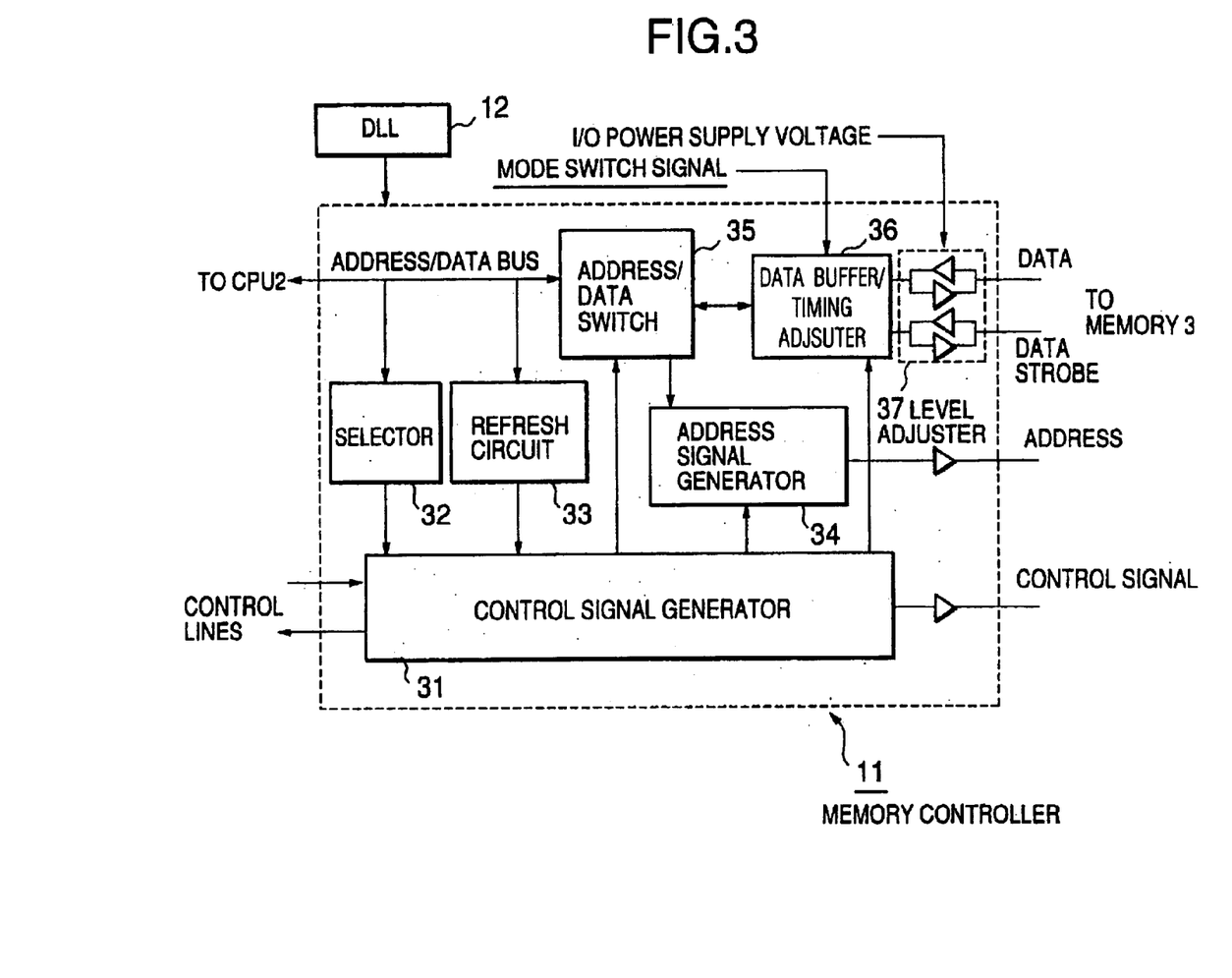
FIG. 3 is a block diagram showing internal circuits of the memory controller according to the embodiment shown in FIG. 2.

Referring to FIG. 3, a delay-locked loop circuit 12 supplies the memory controller 11 with a necessary internal clock signal. Further, a power supply circuit (not shown) supplies the memory controller 11 with a power supply voltage.

The memory controller 11 is provided with a control signal generator 31, which supplies respective control signals to address/data switch 35, address signal generator 34, and data buffer 36 in response to control data received from selector 32 and refresh circuit 33. The selector 32 determines an access mode from data and address data on an address/data bus to output access mode control data to the control signal generator 31. The refresh circuit 33 generates refresh timing control data from data and address data on the address/data bus and outputs it to the control signal generator 31.

The CPU 2 supplies data and address data to the selector 32, the refresh circuit 33 and the address/data switch 35 through the address/data bus. The address/data switch 35 divides data and address data on the address/data bus respectively to the data buffer 36 and the address signal generator 34 depending on the control signal from the control signal generator 31. The address signal generator 34 inputs the address data from the address/data switch 35 to generate an address signal based on the control signal received from the control signal generator 31. The address signal is output to the memory 3.

The data buffer 36 receives the mode switch signal from outside and further a clock signal and a data strobe signal from the control signal generator 31. The data buffer 36 has a bidirectional data port and a bidirectional data strobe port, which are connected to the memory 3 through the level adjuster 37. The data buffer 36 performs data input/output timing adjustment depending on which one of SDR SDRAM mode and DDR mode is selected, which will be described later. Therefore, the data buffer 36 may be referred to as a timing adjuster. Here, when the mode switch signal is high, the data buffer 36 is set to SDR SDRAM mode, allowing data read and write of SDR SDRAM. When the mode switch signal is low, the data buffer 36 is set to DDR mode, allowing data read and write of DDR SDRAM.

The level adjuster 37 includes two pairs of input and output amplifiers, the respective two pairs corresponding to the bidirectional data port and the bidirectional data strobe port of the data buffer 36. Each pair of the input and output amplifiers is supplied with an input/output (I/O) power supply voltage depending on which one of SDR SDRAM and DDR SDRAM is connected as the memory 3. In the case where the memory 3 is SDR SDRAM, the voltage relationship related to I/O signals is set to a level of LVTTL (Low Voltage Transistor Transistor Logic). On the other hand, in the case where the memory 3 is DDR SDRAM, the voltage relationship related to I/O signals is set to a level of SSTL-2 (Series Stub Termination Logic-2). Such a level interface circuit supporting both LVTTL and SSTL has been disclosed in Japanese Patent Application Unexamined Publication Kokai No. 11-88146.

In SDR SDRAM-mode write operation, the data is output from the address/data switch 35 to the data buffer 36, in which the output timing of the data is adjusted so as to meet the SDR SDRAM-mode requirement. The voltage level of data outputted from the data buffer 36 is adjusted to the LVTTL level by the level adjuster 37 and then the data is written onto the memory 3 (here, SDR SDRAM).

In DDR-mode write operation, the data is output from the address/data switch 35 to the data buffer 36, in which the output timing of the data is adjusted so as to meet the DDR-mode requirement. The voltage level of the data and data strobe outputted from the data buffer 36 is adjusted to the SSTL-2 level by the level adjuster 37. Thereafter, the data and the data strobe signals are output to the memory 3 (here, DDR SDRAM). In this manner, the data is written into the memory 3.

In SDR SDRAM-mode read operation, data read out from the memory 3 (here, SDR SDRAM) is adjusted in voltage to a CPU-side voltage level at the level adjuster 37 and then is adjusted in timing at the data buffer 36. The timing-adjusted data is output from the data buffer 36 to the CPU 2 through the address/data switch 35 and the address/data bus.

In DDR-mode read operation, data and data strobe signals read out from the memory 3 (here, DDR SDRAM) are adjusted in voltage to a CPU-side voltage level at the level adjuster 37. The data is adjusted in timing depending on the data strobe signal at the data buffer 36. The timing-adjusted data is output from the data buffer 36 to the CPU 2 through the address/data switch 35 and the address/data bus.

Data Buffer

Figure 4:
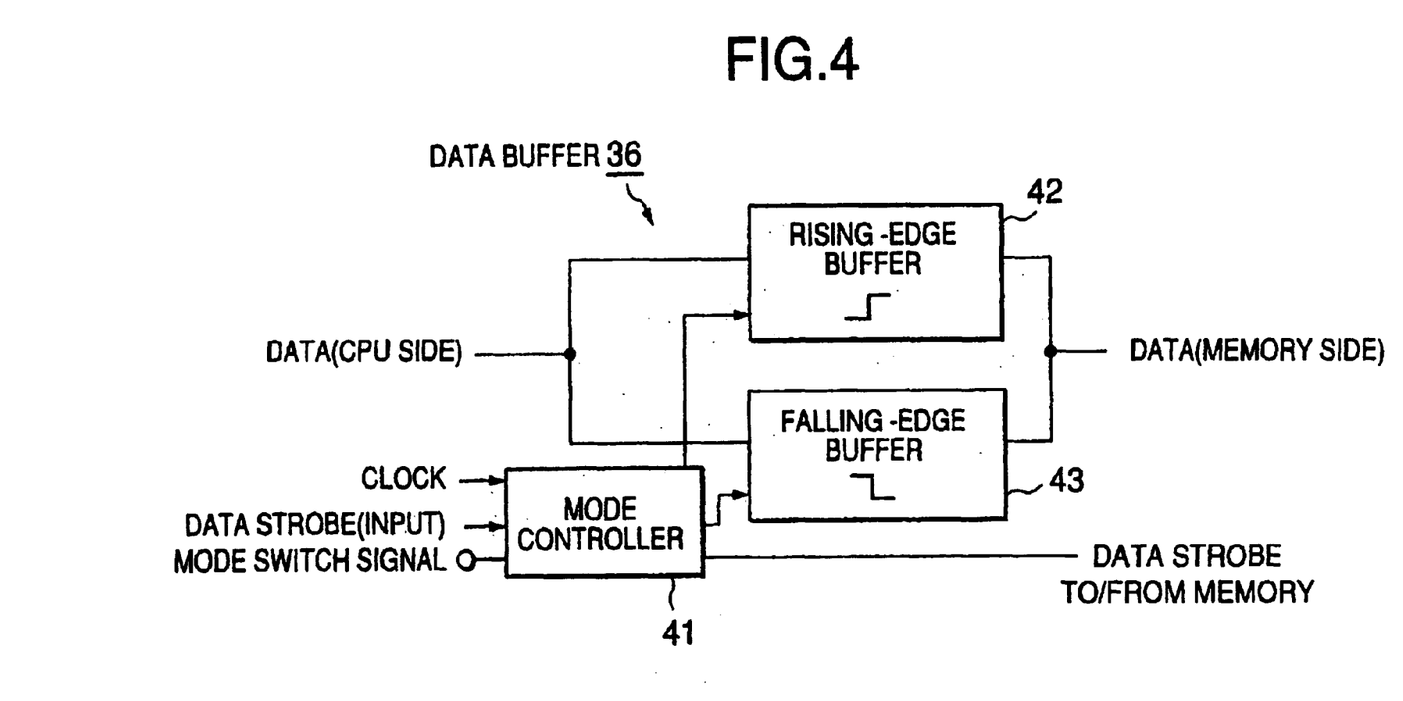
FIG. 4 is a block diagram showing internal circuits of a data buffer in the memory controller of FIG. 3.
Figures 5A, 5B, 5C:
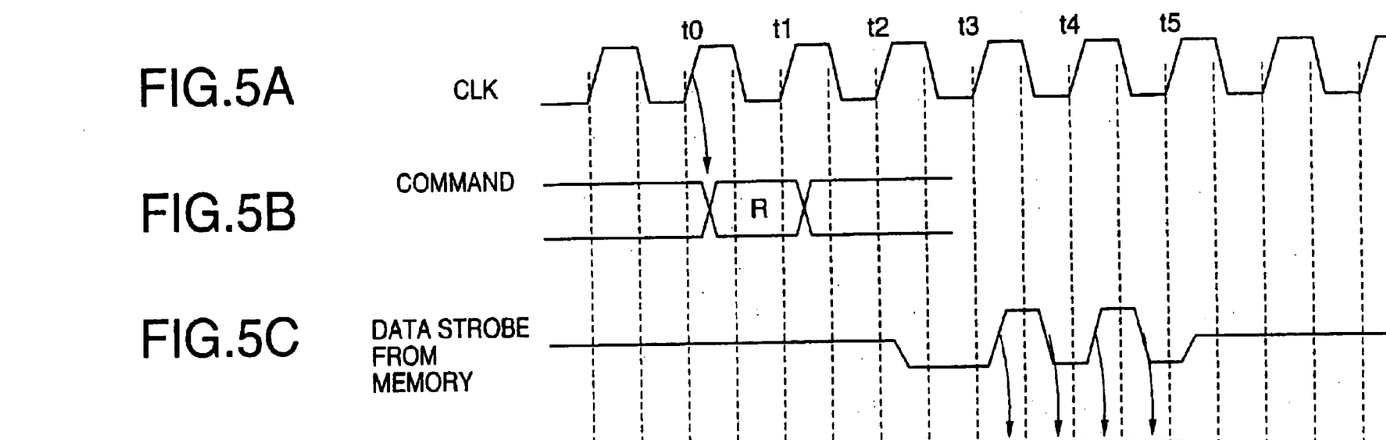
FIGS. 5A–5D are time charts showing a DDR-mode read operation in accordance with an embodiment of the invention.
Figure 5D:
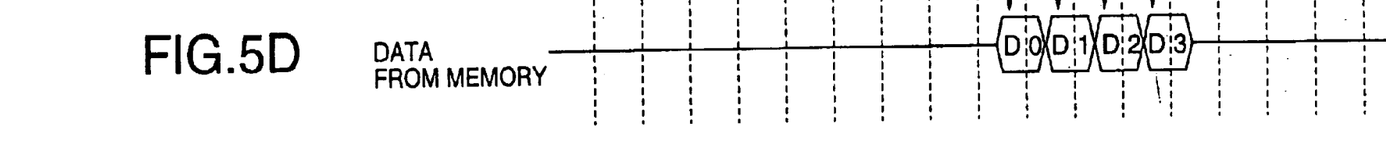

Referring to FIG. 4, the data buffer 36 includes a mode controller 41, a rising-edge buffer 42, and a falling-edge buffer 43. The mode controller 41 inputs the clock signal and data strobe signal from the control signal generator 31 and further inputs the mode switch signal from outside.

When the mode switch signal is high, that is, in SDR SDRAM mode, the mode controller 41 supplies the clock signal to only the rising-edge buffer 42. Accordingly, data received from the CPU 2 is captured and stored in the rising-edge buffer 42 at the rising edge of the clock signal, allowing transfer timing of the data to be adjusted so as to meet the SDR SDRAM requirement.

When the mode switch signal is low, that is, in DDR mode, the mode controller 41 supplies an input data strobe signal to both the rising-edge buffer 42 and the falling-edge buffer 43 and further outputs it as an output data strobe to the memory 3 through the level adjuster 37. Accordingly, data received from the CPU 2 is captured and stored in the rising-edge buffer 42 at the rising edge of the data strobe signal and is captured and stored in the falling-edge buffer 43 at the falling edge of the data strobe signal, allowing transfer timing of the data to be adjusted so as to meet the DDR SDRAM requirement.

The mode switch operation as described above may be implemented by a mode switch program running on a program-controlled processor.

Operation

Hereafter, read and write operations and mode switch operation will be described with reference to FIGS. 5–8, taking as an example the case where CAS (column address strobe) latency CL is 2 and burst length BL is 4. The CAS latency CL is defined as the number of clocks needed until data is issued at a point of time when a read command has issued. The burst length BL is defined as the number of consecutive data.

DDR-Mode Read Operation

Referring to FIGS. 5A–5D, when a read (R) command is issued at clock timing t0, a data strobe signal from the DDR memory 3 goes low during an initial or "preamble" portion of time at clock timing t2, which is two clocks after the read command is issued, because of CL=2. After a lapse of one clock, the data strobe signal goes high for clock timing t3. At the rising edge of the data strobe signal, first data D0 from the DDR memory 3 is captured and stored in the rising-edge buffer 42 of the data buffer 36. Subsequently, when the data strobe signal goes low between t3 and t4, second data D1 from the DDR memory 3 is captured and stored in the falling-edge buffer 43 of the data buffer 36.

Similarly, at the next rising edge of the data strobe signal for clock timing t4, third data D2 from the DDR memory 3 is captured and stored in the rising-edge buffer 42 of the data buffer 36. Subsequently, at the next falling edge of the data strobe signal between t4 and t5, fourth data D3 from the DDR memory 3 is captured and stored in the falling-edge buffer 43 of the data buffer 36.

SDR SDRAM-Mode Read Operation

Figure 6A:
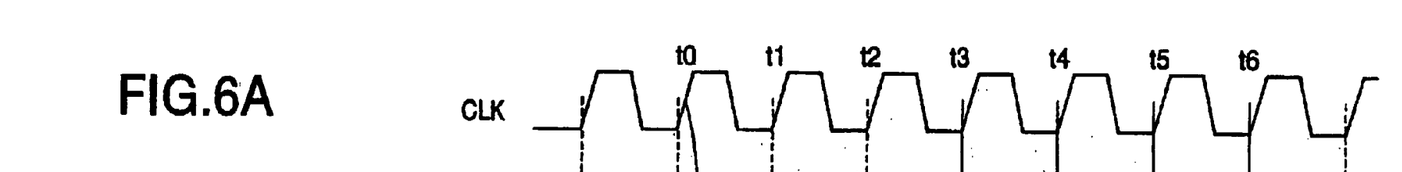
FIGS. 6A–6C are time charts showing an SDR SDRAM-mode read operation in accordance with an embodiment of the invention.
Figure 6B:
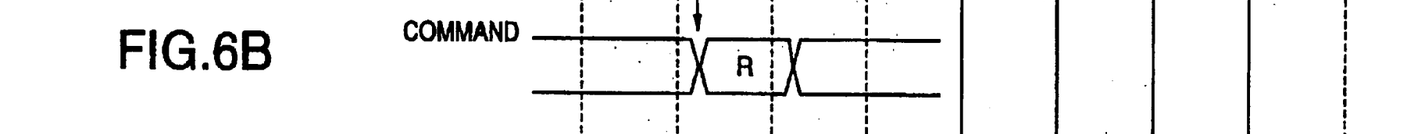
Figure 6C:
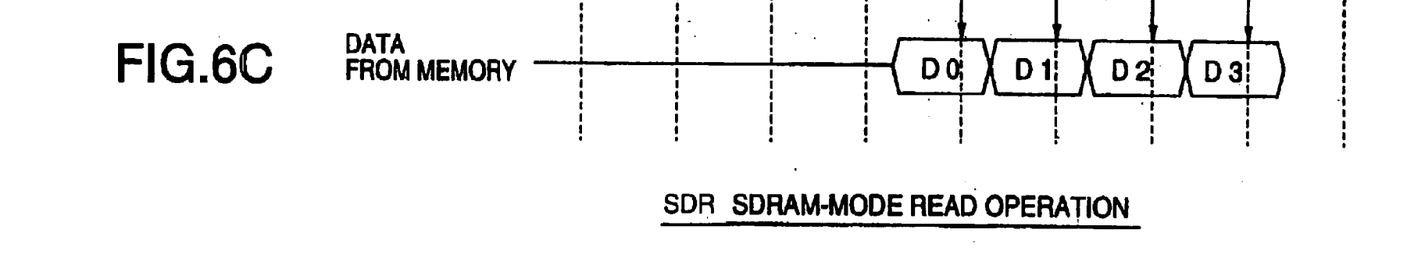
Figure 7A:
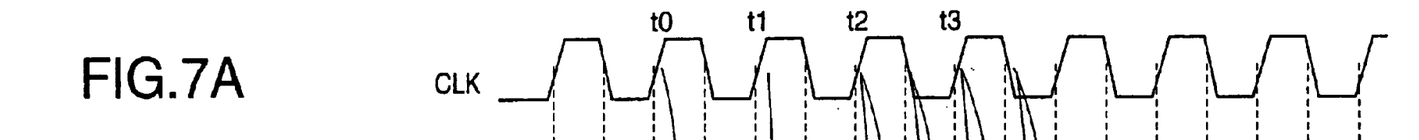
FIGS. 7A–7D are time charts showing a DDR-mode write operation in accordance with an embodiment of the invention.
Figure 7B:
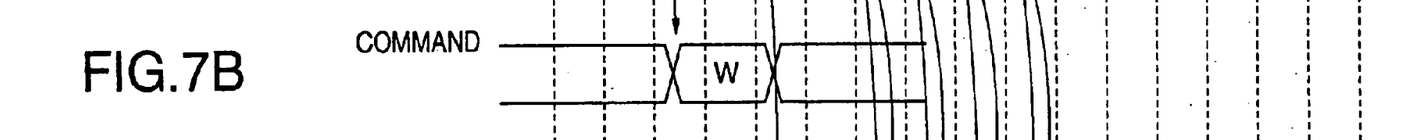
Figure 7C:
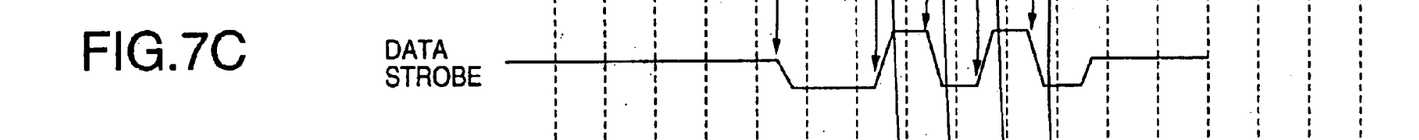
Figure 7D:
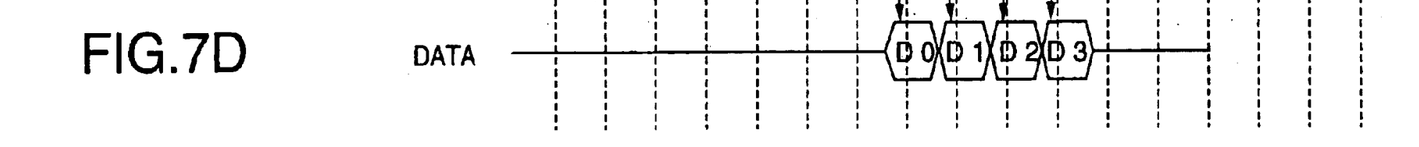

Referring to FIGS. 6A–6C, in SDR SDRAM mode, the data strobe signal is not used. Only a rising edge of the clock signal is used to read data from the SDRAM memory 3. Accordingly, the falling-edge buffer 43 is not used in the SDR SDRAM mode.

More specifically, when a read (R) command is issued at clock timing t0, first data D0 is output from the DDR memory 3 at clock timing t2, which is two clocks after the read command is issued, because of CL=2. The first data D0 is captured and stored in the rising-edge buffer 42 at clock timing t3. Similarly, second data D1 is captured and stored in the rising-edge buffer 42 at clock timing t4, and subsequently third data D2 and fourth data D3 are captured and stored in the rising-edge buffer 42 at clock timing t5 and t6, respectively.

DDR-Mode Write Operation

Referring to FIGS. 7A–7D, when a write (W) command is issued at clock timing t0, an input data strobe signal goes low during an initial or "preamble" portion of time at clock timing t1. After a lapse of one clock, the data strobe signal goes high synchronously with clock timing t2 and first data D0 is output from the rising-edge buffer 42 of the data buffer 36 to the DDR memory 3. Subsequently, when the data strobe signal goes low between t2 and t3, second data D1 is output from the falling-edge buffer 43 of the data buffer 36 to the DDR memory 3. In this manner, a predetermined number of data D0–D3 (here, BL=4) are written into the DDR memory 3 while synchronizing the data strobe signal with the clock signal.

SDR SDRAM-Mode Write Operation

Figure 8A:
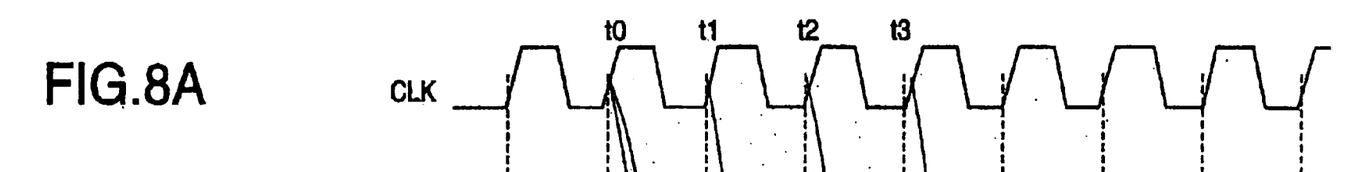
FIGS. 8A–8C are time charts showing an SDR SDRAM-mode write operation in accordance with an embodiment of the invention.
Figures 8B, 8C:
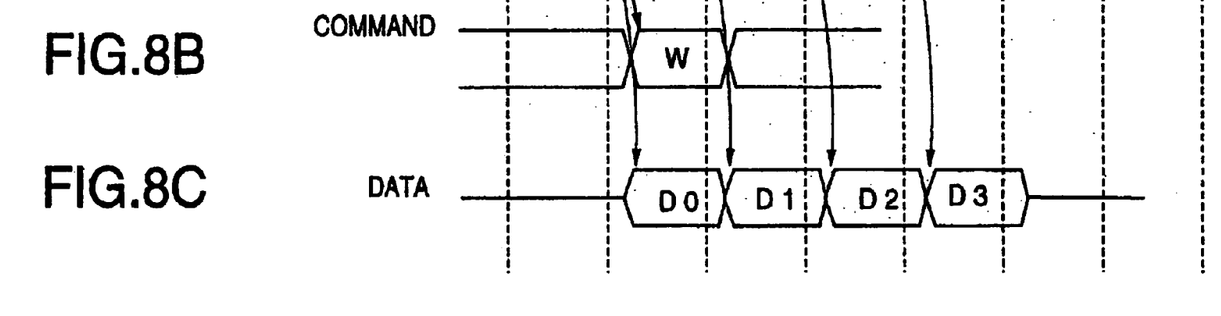

Referring to FIGS. 8A–8C, in SDR SDRAM mode, the data strobe signal is not used. Accordingly, when a write (W) command is issued at clock timing t0, first data D0 is output from the rising-edge buffer 42 of the data buffer 36 to the DDR memory 3. Similarly, second to fourth data D1–D3 are sequentially written into the DDR memory 3 synchronously with clock timing t1 to t3 of the clock signal.

As described above, in SDR SDRAM mode, no data strobe signal is used and therefore the mode controller 41 does not supply the data strobe signal to the rising-edge and falling edge buffers 42 and 43. Accordingly, there is no need of masking control of the data strobe signal.

In the above embodiment, the case of DRAM was described. However, the present invention can be also applied to the case of SRAM because DDR-SRAM is available. Further, the present invention can be also applied to the case of three or more types of memories.

What is claimed is:

1. A memory controller for controlling data communication with a plurality of memory device types of different data rate types, comprising:

a first buffer for capturing data at a rising edge of a timing control signal;

a second buffer for capturing data at a falling edge of a timing control signal; and a mode controller for controlling a timing control signal supplied to the first and second buffers to meet timing requirements of a memory device of each type depending on a mode selection signal inputted from outside.

2. The memory controller according to claim 1, further comprising:

a level adjuster for adjusting a voltage level of data to be transferred between the memory device and the first and second buffers depending on the type of the memory device.

3. The memory controller according to claim 1, wherein the mode controller selects one of a clock signal and a data strobe signal as the timing control signal depending on the mode selection signal.

4. The memory controller according to claim 3, wherein the memory device is a synchronous RAM (random access memory), and the mode controller selects the clock signal to supply it as the timing control signal to the first buffer.

5. The memory controller according to claim 3, wherein the memory device is a double data rate (DDR) synchronous RAM (random access memory), and the mode controller selects the data strobe signal to supply it as the timing control signal to the first and second buffers.

6. A control method for controlling data communication with a plurality of memory device types, comprising the steps of:
   a) capturing data in a first buffer at a rising edge of a timing control signal;
   b) capturing data in a second buffer at a falling edge of a timing control signal; and
   c) controlling a timing control signal supplied to the first and second buffers to meet timing requirements of each memory device type depending on a mode selection signal inputted from outside.

7. The control method according to claim 6, further comprising the step of:
   adjusting a voltage level of data to be transferred between the memory device and the first and second buffers depending on the type of the memory device.

8. The control method according to claim 6, wherein in the step (c), one of a clock signal and a data strobe signal is selected as the timing control signal depending on the mode selection signal, and
   the mode selection signal is based on data rate type of each memory device type.

9. The control method according to claim 8, wherein the memory device is a synchronous RAM (random access memory), and the clock signal is selected to supply it as the timing control signal to the first buffer.

10. The control method according to claim 8, wherein the memory device is a double data rate (DDR) synchronous PAM (random access memory), and the data strobe signal is selected to supply it as the timing control signal to the first and second buffers.

11. A computer readable recording medium storing a computer program instructing a computer to control data communication with a plurality of memory device types, the program, when executed by the computer, performing the steps of:
   a) capturing data in a first buffer at a rising edge of a timing control signal;
   b) capturing data in a second buffer at a falling edge of a timing control signal; and
   c) controlling a timing control signal supplied to the first and second buffers to meet timing requirements of each memory device type depending on a mode selection signal inputted from outside.

12. A memory controller for controlling data communications between a plurality of memory device types of different data rate types and a central processing unit (CPU), comprising:
   an address/data bus for connection to the CPU;
   a data line for bi-directional connection to a memory device;
   a data strobe line for bi-directional connection to the memory device for transmission of a data strobe signal;
   a data buffer coupled between the address/data bus and the data line,
   the data buffer configured to capture data from the memory device and transfer the captured data, via the address/data bus, to the CPU,
   the data buffer
   adjusting timing of data transfer between the memory device and the address/data bus by controlling a timing control signal, said data buffer including a mode controller for controlling the timing control signal to meet timing requirements of each memory device type of the plurality of memory device types based on a mode selection signal inputted to the mode controller from outside,
   the mode selection signal being based on the memory data rate type of the memory device connected to the memory controller.

13. The memory controller of claim 12, wherein the memory device types comprise at least single data rate memory type and double data rate memory type.

14. The memory controller of claim 12, wherein,
   the plurality of memory device types comprise single data rate (SDR) memory and double data rate (DDR) memory,
   a mode selection signal having a first value is inputted to the mode controller when a first memory device type of single data rate memory is connected to the memory controller,
   a mode selection signal having a second value is inputted to the mode controller when a second memory device type of double data rate memory is connected to the memory controller, and
   the data buffer adjusts timing of data transfer between the memory device and the address/data bus by controlling the timing control signal to correspond to single data rate memory when the first mode selection value is inputted to the mode controller and adjusts timing of data transfer between the memory device and the address/data bus by controlling the timing control signal to correspond to double data rate memory when the second mode selection value is inputted to the mode controller.

15. The memory controller of claim 14, wherein,
   the mode controller supplies the timing control signal to plural buffers; and
   the data buffer further comprises
      a first buffer for capturing data at a rising edge of timing control signal; and
      a second buffer for capturing data at a falling edge of the timing control signal.

16. The memory controller of claim 14, wherein,
   upon the first mode selection signal being inputted to the mode controller after the first memory device type of single data rate memory is connected to the memory controller, the mode controller selects a clock signal to supply as the timing control signal to the first buffer, and
   upon the second mode selection signal being inputted to the mode controller when the second memory device type of double data rate memory is connected to the memory controller, the mode controller selects the data strobe signal to supply as the timing control signal to the first and the second buffers.

* * * * *